UNITED STATES PATENT OFFICE.

WALTER D. FIELD, OF SPRINGFIELD, NEW JERSEY.

VARNISH.

SPECIFICATION forming part of Letters Patent No. 422,195, dated February 25, 1890.

Application filed November 30, 1888. Serial No. 292,306. (No specimens.) Patented in England November 17, 1887, No. 15,771.

*To all whom it may concern:*

Be it known that I, WALTER D. FIELD, a citizen of the United States, residing at Springfield, in the county of Union and State of New Jersey, have invented certain new and useful Improvements in the Manufacture of Spirit Varnishes, (for which Letters Patent of Great Britain, No. 15,771, were granted November 17, 1887;) and I do hereby declare the following to be a full, clear, and exact description of the invention, such as will enable others skilled in the art to which it appertains to make and use the same.

Heretofore non-hygroscopic varnishes and lacquers possessing desirable qualities of hardness, contractility, and transparency have been made by dissolving pyroxyline in suitable non-hygroscopic menstrua or mixtures of menstrua, and hygroscopic varnishes and lacquers possessing desirable qualities of adhesiveness have been prepared by using resins or gum-resins as a base. The practical difficulties with varnishes and lacquers made in either of these ways have been that for some uses those having pyroxyline alone as a base have lacked adhesiveness, and those having gum-resins alone as a base, while adhesive, have been more or less hygroscopic and have lacked the toughness and the sometimes desirable qualities of contractility and flexibility found in the pyroxyline varnishes, and have also had a tendency to show chalky marks when scratched in handling.

The object of my experiments has been to produce a practically non-hygroscopic varnish or lacquer having the adhesiveness of the best resin or gum-resin varnishes, combined with the qualities of toughness, contractility, flexibility, hardness, and transparency of pyroxyline varnishes or lacquers, which would resist water and the atmosphere as well, and which would also be practically non-hygroscopic and not cloud in use. In the course of my experiments I soon discovered that among the different resins or gum-resins shellac was best adapted for this purpose, but that it could not be successfully used in its ordinary commercial condition, because of its impurities, chief among which was wax, which softened the varnish, caused it to cloud when applied to polished surfaces, and to show chalky marks when scratched, and also because when any large amount of shellac was used in a thin solution it was found to necessitate the introduction of too much of the hygroscopic solvent of the shellac. I have, however, discovered, after a long series of experiments, that by using a concentrated solution of shellac cleared and purified in the manner indicated in my application for Letters Patent for new and useful "improvements in the manufacture of spirit varnishes," bearing even date herewith, or otherwise, and mixing that cleared, purified, and concentrated solution of shellac with a solution of pyroxyline in some non-hygroscopic menstruum or mixtures of menstrua harmonious or miscible with the menstruum of the shellac solution, shellac may be successfully mixed with pyroxyline to form the base of the varnish. Care should be taken, however, when shellac and pyroxyline are used in unequal quantities and the solvents used are not solvents of both, to introduce sufficient solvent of the lesser material to prevent its precipitation. By these means produce a varnish or lacquer having the adhesiveness of a shellac varnish, with none of its defects, and possessing the free-flowing, smooth, tough, hard, flexible, contractile, and transparent qualities of pyroxyline varnish or lacquer, practically non-hygroscopic, and combining the good qualities of pyroxyline and resin varnishes.

By "practically non-hygroscopic" I mean having practically no affinity for water.

Of course in making this varnish the proportions of shellac and pyroxyline may be varied, and it is impossible to specify all the various proportions in which they may be mixed, or the various solvents or menstrua that may be employed, except that they must be such as will preserve the practically non-hygroscopic character of the solution; but I have found that for use on metals and other non-absorptive surfaces a varnish made after the following formula produces excellent results: amyl-acetate, sixty gallons; amyl-alcohol, thirty gallons; methyl-alcohol, seven gallons; pyroxyline, twenty-five pounds; a cleared solution of shellac in methyl-alcohol, containing four and one-half pounds of shellac to the gallon of solution, three gallons; but the proportion of the shellac solution may be reduced to one-half or one gallon, or even less, and still produce excellent results. It will be understood, however, that this formula is given by way of example merely, and is not intended to limit this invention to the proportions or solvents mentioned.

This varnish is particularly clear and transparent if a cleared solution of bleached shellac (prepared as indicated in my application for Letters Patent for new and useful "improvements in the manufacture of spirit varnishes," bearing even date herewith) is used.

I am aware of the pyroxyline preparation for waterproofing textile materials described in the patent to I. V. Reagles, No. 333,203, of January 27, 1885; but the compound described in the Reagles patent is not a non-hygroscopic compound, and is not serviceable as a varnish on metals or hard non-absorptive surfaces, and is not within the scope of this invention. The Reagles compound contains castor-oil, which although if present in sufficient quantity will render the preparation non-hygroscopic, yet the presence of such an amount of castor-oil renders it useless as a varnish for metals, as it becomes practically non-drying and non-adhering. The formula given contains so large an amount of methyl-alcohol as to render the compound hygroscopic.

It will be observed that in the manufacture of this varnish the non-hygroscopic solution of pyroxyline is used in large enough proportions to neutralize the small amount of water in the concentrated shellac solution, and hence produce a practically non-hygroscopic varnish.

I therefore claim as my invention and desire to secure by Letters Patent—

1. A non-hygroscopic varnish or lacquer for use on metals and hard or non-absorptive surfaces, consisting of a concentrated solution of shellac, in combination with a solution of pyroxyline in a practically non-hygroscopic menstruum miscible with the shellac solution in the proportions substantially as specified, as and for the purpose set forth.

2. A non-hygroscopic varnish or lacquer for use on metals and hard or non-absorptive surfaces, consisting of a cleared and concentrated solution of shellac, in combination with a solution of pyroxyline in a practically non-hygroscopic menstruum miscible with the shellac solution in the proportions substantially as specified, as and for the purpose set forth.

In testimony whereof I affix my signature in presence of two witnesses.

WALTER D. FIELD.

Witnesses:
JOSEPH D. GALLAGHER,
CHARLES L. CONOVER.